United States Patent
Allen et al.

(10) Patent No.: US 6,632,502 B1
(45) Date of Patent: Oct. 14, 2003

(54) METHOD FOR FABRICATING AN ADVANCED COMPOSITE AEROSTRUCTURE ARTICLE HAVING AN INTEGRAL CO-CURED FLY AWAY HOLLOW MANDREL

(75) Inventors: Gregory A. Allen, Highland, CA (US); Jesse C. Dinkel, Corona, CA (US); John S. Sentz, Riverside, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 10/142,490

(22) Filed: May 9, 2002

Related U.S. Application Data

(62) Division of application No. 09/309,390, filed on May 10, 1999, now Pat. No. 6,458,309.
(60) Provisional application No. 60/087,488, filed on Jun. 1, 1998.

(51) Int. Cl.[7] .................................................. B32B 7/00
(52) U.S. Cl. .................................................... 428/119
(58) Field of Search .............................. 428/34.6, 34.7, 428/35.7, 174, 34.2, 35.4, 35.8, 76, 158, 118, 116, 119, 316.6, 308.4; 52/789.1, 790.1, 793.1

(56) References Cited

U.S. PATENT DOCUMENTS

| | | |
|---|---|---|
| 5,061,418 A | 10/1991 | Ware .......................... 264/46.6 |
| 5,089,328 A | 2/1992 | Doerer et al. ............. 428/308.4 |
| 5,135,799 A | 8/1992 | Gross et al. ................. 428/215 |
| 5,234,757 A | 8/1993 | Wong ....................... 428/311.1 |
| 5,284,702 A | 2/1994 | Umemoto et al. .......... 428/272 |
| 5,338,594 A | 8/1994 | Wang et al. ................. 428/117 |
| 5,445,861 A | 8/1995 | Newton et al. ............. 428/116 |

*Primary Examiner*—Merrick Dixon
(74) *Attorney, Agent, or Firm*—Goodwin Procter LLP

(57) ABSTRACT

A novel method is disclosed for fabricating a co-cured advanced composite integral one piece aerostructure article. The method comprises assembling on a composite bond jig a first uncured composite layer in the shape of at least one surface of a composite aerostructure article, the first composite layer having at least one uncured resin-impregnated laminate layer. At least one longitudinally extending hollow mandrel is secured on the upper surface of the first composite layer. A second uncured composite layer is assembled on the bond jig over the upper outer surface of the hollow mandrel and at least a portion of the first uncured composite layer, the second uncured composite layer having at least one uncured resin-impregnated layer. The lay up assembled on the composite bond jig is subjected to a cycle of predetermined pressure and temperature to cure such resin impregnated layers to form a unitary co-cured one-piece aerostructure article.

15 Claims, 4 Drawing Sheets

METHOD FOR FABRICATING AN ADVANCED COMPOSITE AEROSTRUCTURE ARTICLE HAVING AN INTEGRAL CO-CURED FLY AWAY HOLLOW MANDREL

CROSS-REFERENCE TO RELATED APPLICATIONS

This application is a divisional application of U.S. patent application Ser. No. 09/309,390, filed May 10, 1999, now U.S. Pat. No. 6,458,309, which claims priority from U.S. Provisional Application No. 60/087,488 filed Jun. 1, 1998 under 35 U.S.C. 119(e).

BACKGROUND OF THE INVENTION

1. Field of the Invention

The present invention relates generally to the field of fabricating advanced composite aerostructure articles and more particularly, but not by way of limitation, to a method for fabricating an advanced composite aerostructure article having an integral co-cured fly away hollow mandrel.

2. Prior Art

There is a growing trend in the aerospace industry to expand the use of advanced composite materials for a diverse array of structural and dynamic aerostructural applications because of the strength-to-weight advantage provided by composite materials. One particular application for the use of such advanced composite materials lies in the fabrication of advanced composite articles such as panels for nacelles for aircraft jet engine propulsion systems. Such structural articles as fan cowls generally comprises inner and outer composite skins, which are formed from composite materials such as graphite or an aromatic polyamide fiber of high tensile strength that are embedded in a resinous matrix, e.g., epoxy, having a honeycomb core material interposed therebetween in the instance of a fuselage panel.

In the instance of an aerospace article such as a fan cowl, one or more stiffening members are affixed to the outer skin and covered with an inner skin for efficiently transmitting and/or reacting axial and/or bending loads to which the fan cowl is subjected.

There are two techniques currently employed for bonding through autoclave processing a composite stiffening member in combination with a composite structural panel: (1) the co-cured bonding method and (2) the secondary bonding method. Both methods are disadvantageous in requiring costly non-recurring tooling and/or costly recurring manufacturing steps.

A typical composite sandwich panel intended for use as an aerostructure article is normally fabricated using two autoclave cured inner and outer composite skins that are formed by using a curing cycle with heat, pressure, and a unique tool for each skin. A sandwich panel is then made up using a composite bond jig, tool or fixture with the pre-cured face skin laid-up on the bond jig tool followed by a ply of film adhesive, a honeycomb aluminum or non-metallic core of a given thickness, another ply of film adhesive and finally the previously pre-cured inner skin. The bond jig that is used to fabricate the sandwich panel is generally the same tool that was used to create the outer composite skin. A plurality of closure plies of uncured composite material are layed up and the assembled sandwich panel are cured during their final assembly stage. This sandwich panel is then vacuum bagged to the composite bond jig and again cured in an autoclave under high pressure and heat.

Thus, at least three very expensive and man-hour consuming cure cycles have gone into the fabrication of this exceptionally strong but lightweight composite/honeycomb core sandwich panel. At least two different and expensive tools are needed in this process. Manufacturing flow time is very long, energy use is high and the manufacturing floor space required is excessive.

The co-curing method envisions curing the composite inner and outer skins that are laid-up with a layer of adhesive film and honeycomb core in one cure cycle in the autoclave. A co-cured panel is desirable in that it is less expensive to fabricate since only one bond jig tool is required, only one cure cycle is needed, it is less labor intensive, it requires less floor space to accomplish, and a much shorter manufacturing flow time is achieved. However, co-curing an aerostructure panel has never achieved wide spread acceptance because of the large loss of panel strength and integrity that is lost due to the lack of compaction of the composite plies placed over and under the honeycomb core details. The composite plies dimple into the center of each core cell with nothing but the cell walls to compact the composite skins. The only way to overcome this knockdown factor is to add extra plies which creates both unwanted weight and excess cost. Thus, because of these constraints co-cured aerostructure panels are not widely manufactured in the aerospace industry.

There are other particular problems when a honeycomb core element is used to provide a stiffening element for an aerospace article such as a fan cowl. As Hartz et al described in U.S. Pat. No. 5,604,010 concerning a "Composite Honeycomb Sandwich Structure", with a high flow resin system, large amounts of resin can flow into the core during the autoclave processing cycle. Such flow robs resin from the laminate, introduces a weight penalty in the panel to achieve the desired performance, and forces over-design of the laminate plies to account for the flow losses. To achieve the designed performance and the corresponding laminate thickness, additional plies are necessary with resulting cost and weight penalties. Because the weight penalty is severe in terms of the impact on vehicle performance and costly in modern aircraft and because the flow is a relatively unpredictable and uncontrolled process aerospace design and manufacture dictates that flow into the core be eliminated or significantly reduced. In addition to the weight penalty from resin flow to the core, it was discovered that microcracking that originated in the migrated resin could propagate to the bond line and degrade mechanical performance. Such microcracking potential has a catastrophic threat to the integrity of the panel and dictates that flow be eliminated or, at least, controlled.

Unfortunately, the use of honeycomb core as a stiffener for elements in a aerostructure article such as a fan cowl, or in a structural panel has other deleterious effects, two of the greatest drawbacks to aluminum core being its inherent significant cost and corrosion. To minimize galvanic corrosion of the core caused by contact with the face skins, isolating sheets are interposed between such aluminum core and the face skins. Also, the aluminum core has an inherent cost and also must be machined to a desired shape in an expensive process. The honeycomb core may also be subject to crush during manufacture and thereby limits the pressures that may be used in autoclave processing. Also, the honeycomb core if damaged in use has a spring back effect which makes the detection of such damage more difficult. Thus, the processing of an aerospace advanced composite article is limited to an autoclave pressure of not greater than 35 psi rather than an advanced pressure that would increase the strength of the resultant advanced composite article.

In providing reinforcing mandrels for stiffener elements, such as hat sections, for aerospace advanced composite structural panels it is also known to provide a composite stiffening member in the form of a polyimidide foam mandrel fabricated by machining a core mandrel to a desired shape. Obviously, the machining of the core mandrel is expensive and time consuming and further introduces the problem of properly bonding the core mandrel to inner and outer skins.

Therefore, a great need has arisen for a practical method of readily producing stiffened, fiber-reinforced composite structures useful in the construction of integrally stiffened components for aerospace applications which are cost and labor efficient and which save time in the fabrication process.

Accordingly, it is an object of the present invention to provide a method for fabricating aerostructure advanced composite articles that eliminates honeycomb core in stiffening elements, provides a lighter weight assembly and is easier to repair.

Another object of the present invention is to reduce the layup cost of known advanced composite co-cure assemblies by at least 15% and to increase assembly strength over such existing co-cure assembly by being able to utilize advanced pressures in autoclave processing.

Yet another object of the present invention is to improve the quality of assembly of such co-cured advance composite assemblies and thereby increase customer satisfaction.

A further object of the present invention is to provide a process that provides an assembly that can be manufactured in one manufacturing cell from raw material to final product.

Yet further objects of the present invention are to reduce the cost of post bond and final assembly work for the final co-cured assembly, which assembly will readily indicate damage to an improved stiffening element.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The foregoing problems are overcome and other advantages are provided by a new and improved method for fabricating an advanced composite aerostructure article from fiber reinforced composite material and incorporating a hollow stiffened graphite fabric mandrel that becomes an integral part of such article.

In accordance with a preferred embodiment of the present invention, a suitable lay-up mandrel or composite bond jig (COBJ) having a predetermined upper lay-up surface receives a first composite uncured layer to provide one surface of a composite aerostructure article, the first uncured layer having at least one uncured resin-impregnated laminate layer. A bond jig may be referred herein as a tool or fixture or lay up mandrel. A hollow mandrel having a predetermined cross sectional shape is layed up on and adhesively tacked to the upper surface of such first uncured composite layer which preferably forms the outer skin of an aerospace article. The hollow mandrel is preferably a spirally wound longitudinally extending shaped formed of a stiffened graphite fabric layer. A second uncured composite layer additional plies of uncured campsite layers is assembled by lay up over the upper outer surface of the bond jig and at least a portion of the first uncured composite layer, the second uncured layer having at least one uncured resin-impregnated layer and, preferably, a plurality of plies that does not cover the open ends of the hollow mandrel.

A suitable flexible tube bag is then positioned within the hollow mandrel and extends beyond its open ends. A suitable vacuum bag is then placed over the lay-up assembled on the layup mandrel or bond jig and removably secured to such lay-up assembly and to the ends of the tube bag as by a suitable sealant tape which permits the ends of the hollow mandrel to remain open. The vacuum bag is exhausted to secure the lay-up assembly upon the lay up mandrel. The lay up assembled on the lay-up mandrel is then subjected in a suitable autoclave to a cure cycle of predetermined pressure and temperature to cure such resin impregnated layers to form a unitary co-cured one piece aerostructure article having a reinforcing hollow hat section provided therein. Since the ends of the hollow mandrel remain open during the cure cycle the lay-up assembly may be subjected to an increased pressure to strengthen the resultant article. Following the cure cycle the bond jig is removed from the autoclave and the co-cured article is removed from the bag and trimmed as desired.

The cross sectional area of the hollow mandrel may be varied as desired to provide a preferred shape that may provide a cross sectional area that may be changed to accommodate other structures that may be in close vicinity to such article in its ultimate use.

To accommodate the need to further strengthen the aerostructure article in certain areas where the configuration of aerospace article or part does not allow access for a tube bag to reach the outer periphery of a hollow mandrel, a hollow mandrel containing a suitable tube bag may be secured to the surface of the first uncured skin layer and in contact with spaced longitudinally extending reinforcing hat sections prior to application of the subsequent composite layers. In this instance, the internal air bag is provided with a suitable vent means extending through the hollow mandrel, the uncured "hat" plies of the second uncured layer and the primary vacuum bag to permit the interior of such bag to freely communicate with the atmosphere in the interior of the autoclave so that the pressure provided within such transversely provided hollow mandrel portion is the same as that pressure experienced on the exterior surface of the lay-up assembly.

A suitable tooling means such as a "throw in block" may be inserted in an end of a hollow mandrel during lay up, the tooling block being configured to allow installation of a tube bag through such block and the hollow mandrel and to provide a particular configuration for such end during the curing process. Thus, a suitable mechanical attachment such as a hinge or latch member may be easily secured to the end of the co-cured hat section without the necessity of providing shimming members as is now required for honeycomb core hat sections for advanced composite aerostructure articles.

The foregoing has outlined rather broadly the more pertinent and important features of the present invention in order the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the happened claims.

BRIEF DESCRIPTION OF THE DRAWINGS

For a fuller understanding of the nature and objects of the invention, reference should be had to the following detailed description taken in conjunction with the accompanying drawings in which.

Similar numerals refer to similar parts in the drawings.

DETAILED DESCRIPTION OF THE PREFERRED EMBODIMENT

Figure 1:
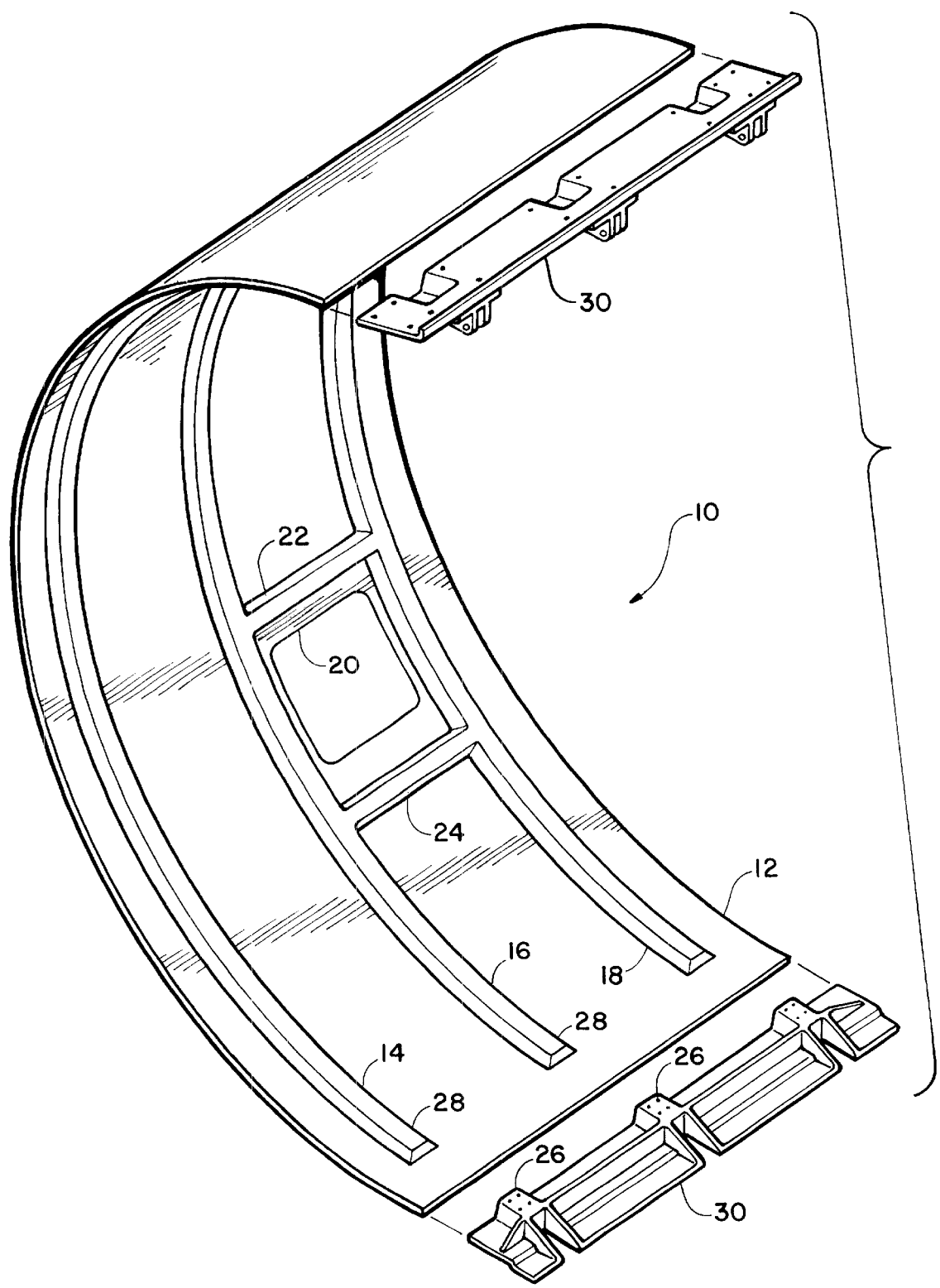
FIG. 1 is a perspective of a co-cured aerospace article that has been fabricated by the method of a preferred embodiment of the present invention.

Referring to the drawings in detail and in particular to FIG. 1, the reference character 10 generally designates an aerostructure article constructed in accordance with a preferred embodiment of the invention. The article 10 is an advanced composite co-cured structure having a unitary skin 12 and circumferentially extending spaced reinforcing hat sections 14, 16, and 18 for the illustrated exemplary part. The article 10 is shown as generally arcuate in shape since the illustrative example of the invention 10 shown in FIG. 1 is representative of a fan cowl for a aircraft turbofan jet engine but the use of the invention for the fabrication of aerostructure articles may extend to other shapes and applications.

An article 10, as illustrated, may typically be provided with an aperture 20 for insertion of an access door (not shown) with reinforcing hat sections 22 and 24 extending transversely to and in fixed integral contact with the circumferentially extending reinforcing hat sections 16 and 18. Suitable mechanical attachments 26 are provided to mate with and be fixedly secured to ends 28 of circumferentially extending hat sections 14,16 and 18. The ends of such hat sections are precisely formed, as will be set forth in detail hereinafter, to permit attachment of the mechanical attachments 26 without requiring the use of shimming. In the particular illustration of the invention 10 in FIG. 1, the mechanical attachments 26 are shown as combined with an integral longeron member 30 for reinforcement purposes. The attachments 26 may be used for hinging the article 10 to another structure or for latching two such articles together or for other desired purposes.

Figure 2:
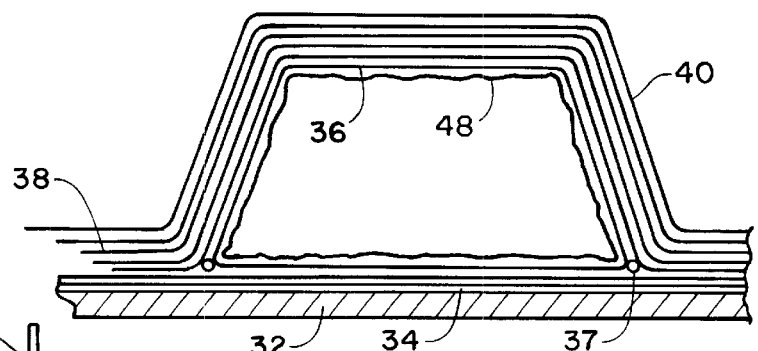
FIG. 2 is a cross sectional view of a longitudinal hat section of the article seen in FIG. 1.

Referring now to FIG. 2, the specific novel method of the present invention that is used to provide the novel reinforcing hat sections seen in FIG. 1 will be described. A suitable lay-up mandrel or composite bond jig (COBJ) 32 having a predetermined shape, such as that used to provide the arcuate shape of the skin 12 of the article 10 is provided for receiving a lay-up assembly for co-curing. A first uncured composite layer 34 is assembled on an upper surface of the lay-up mandrel 32 to provide the shape of at least one surface of the composite aerostructure article 10. The first uncured layer 34 having at least one uncured resin-impregnated laminate layer that is generally a graphite or aramid fabric laminate layer that is termed a "pre-preg" in the advanced composite manufacturing industry. The first uncured composite layer 34, which may have a plurality of uncured resin-impregnated laminate plies, will be seen to provide the outer skin of the article 10.

Figure 5:
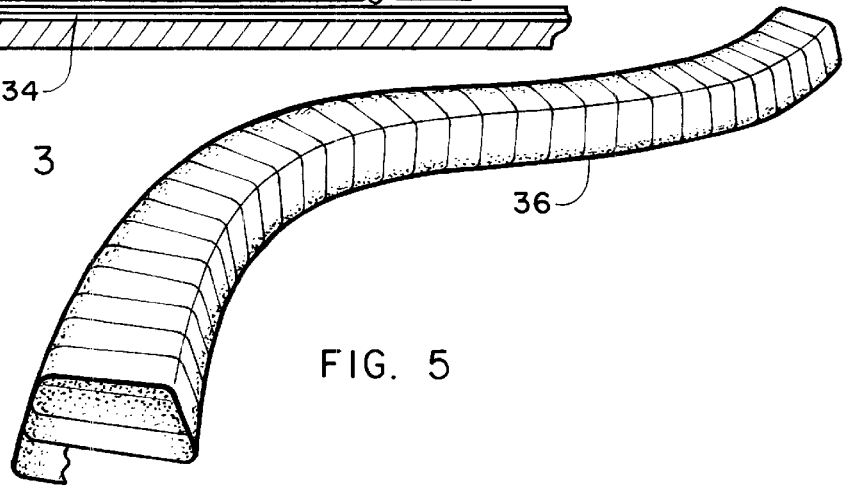
FIG. 5 is perspective of the hollow mandrel used to reinforce the hat sections of FIGS. 2 and 3 and illustrating how it may be desirably deformed to provide desired form for such hat sections.

A lightweight circumferentially extending hollow mandrel 36 is layed up on the first composite preform layer 34 by a suitable uncured tacking adhesive, not shown, such as EA9689 made by The Dexter Corp., Hysol Aerospace Products, 2850 Willow Pass Road, P. O. Box 3123, Bay Point, Calif. The hollow mandrel 36 is, in effect, "tacked" to the first preform layer 34 by the adhesive. As can be seen in FIG. 5, the hollow mandrel 36 is a pre-stiffened flexible spirally arranged shape that longitudinally extends along the upper surface of the layer 34. The cross sectional shape of the hollow mandrel 36 may be determined to provide optimal stiffening of the hat section 14 of the article 10. A preferred cross sectional form for the hollow mandrel 36 would be trapezoidal to provide the greatest strength but other shapes such as square, rectangular or round could be provided as desired. Another desirable feature of the hollow mandrel 36 is that the cross sectional shape may be varied during the length of a hat section to accommodate other needs. For example, if the article 10 were to be a fan cowl for an aircraft turbofan engine enclosure then the height of the hollow mandrel 36 could be decreased in areas to accommodate the space requirements of equipment carried by the core engine.

As seen in FIG. 5, the spiral wound configuration of the hollow mandrel 36 permits it to be flexed in a desirable direction, such as the arcuate shape of FIG. 1, or the sinuous,shape of the mandrel as seen in FIG. 5. A pre-stiffened hollow mandrel 36 may be procured from AIRTECH International Inc., 2542 East Del Amo Blvd., P. O. Box 6207, Carson, Calif. The hollow mandrel 36 is pre-stiffened to the extent required to provide a desired hat configuration during the continuing fabrication of the article 10 as described hereinafter.

A second uncured composite layer 38 is then assembled on the lay up mandrel over the upper outer surface of the hollow mandrel 36 and over at least a portion of the first composite layer 34. However, it should be recognized that the corners of the cross-sectional shape of the hollow mandrel 36 are not sharp but are rounded as would be expected in the formation of the spirally wound hollow mandrel 36. While the strength of a hat section fabricated with a hollow mandrel having rounded corners is sufficiently strong, the strength of such a hat section can be improved by providing, in effect, a fillet 37 along the longitudinal length of the intersection of the bottom of the hollow mandrel 36 and the first composite preform layer 34. This fillet 37 may be advantageously provided by positioning a very small roll of graphite fiber fabric material or a small roll of unidirectional material or longitudinally extending strands of such material in the small circumferentially extending gap provided by a rounded corner of a hollow mandrel 36 and the first uncured composite layer 34. The graphite fiber material of the fillet 37 may either uncured resin impregnated graphite material or a resin free graphite material.

The second uncured composite layer 38 is comprised of at least one ply of an uncured resin-impregnated graphite or aramid fabric material. Commonly, as is seen in FIG. 2, the first uncured composite layer 38 may comprise three layers, or as many as desired, of uncured resin-impregnated graphite or aramid fabric material or, as is commonly termed, "prepreg" material and provides the outer skin of the article 10.

The lay-up assembly provided thus far by the novel method is then covered by a suitable vacuum bag 40 which is removably sealingly secured to the outer surface of the lay-up assembly and to the lay-up mandrel 32 as by a suitable sealant tape. The vacuum bag 40 is secured to the ends of the tube bag 48 and to the periphery of the bond jig 32 to permit the interior of a hollow mandrel 36 to communicate with the exterior of the vacuum bag 40 as will be described in greater detail with relation to FIG. 10. The vacuum bag 40 is then exhausted to secure the lay up assembly upon the upper surface of the lay up mandrel or tool 32.

The lay up assembly arranged on the mandrel 32 is then placed in a suitable autoclave and subjected to a suitable curing cycle having an elevated temperature and elevated pressure over a desired time period to provide for curing of the first and second composite layers 34 and 38 and the hollow mandrel 36 into a unitary co-cured one piece aerostructure article. Since the interior of the hollow mandrel 36 is open to the atmosphere of the autoclave, an increased pressure may be exerted upon the lay up assembly during the cure cycle since the increased pressure within the autoclave will be balanced by the pressure within the hollow mandrel 36 since the expanded tube bag 41 will conform to the interior shape of the hollow mandrel 36.

Characteristically, an ultimate pressure of no greater than 45 psi may be used in the curing of an aerostructure article having a honeycomb core type hat section because of the possibility of crushing the core or causing dimpling of the plies overlying the core. In the practice of the novel method of the present invention this pressure in the autoclave can be increased to fall within a range of 45–70 psi for the curing cycle for resin impregnated graphite or aramid fabric material. Other higher pressures could be used for the curing cycle, as may be desired for other advanced composite materials. The use of an increased pressure provides for greater quality of the article and increased physical properties. It will be seen that the curing process will provide for the resins of the first and second composite preform layers 34 and 38 to penetrate the graphite fabric material of the hollow mandrel 36 and the tacking adhesive of flows as well to provide an integral co-cured article.

After the curing cycle has been completed in the autoclave the lay up mandrel is removed from the autoclave and the vacuum bag 40 is removed from the article 10 and the mandrel 32. The article 10 may then be removed from the lay up mandrel 32 and suitably trimmed for further use.

Figure 3:
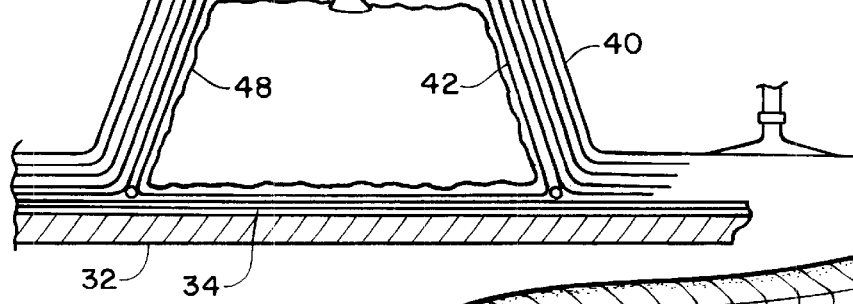
FIG. 3 is a cross sectional view of a hat section of the article seen in FIG. 1 and extending between spaced longitudinally extending hat sections.
Figure 4:
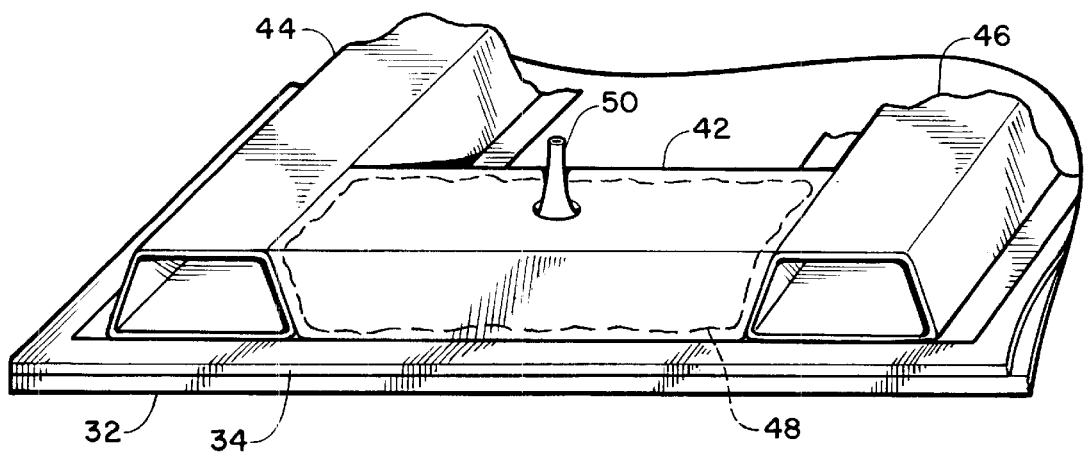
FIG. 4 is a perspective of the hat section arrangement of FIG. 3 as disposed transversely between longitudinally extending reinforcing hat sections as shown in FIG. 2.

As seen in FIG. 1, the present invention also provides for the interposing of reinforcing hat sections, such as hat sections 22 and 24 that are transversely disposed to circumferentially reinforcing hat sections 16 and 18. Referring now to FIGS. 3 and 4, it will be seen that a pre-stiffened reinforcing hollow mandrel 42 of the hat section 24, for example, is positioned on the first uncured composite layer 34 and extends transversely to and in contact with the adjacent sidewalls of the cross sectional shapes of the pre-stiffened hollow mandrels 44 and 46 that are respectively disposed in the hat sections 16 and 18 of the article 10. The hollow mandrel 42 is composed of the same pre-stiffened graphite fabric material as the mandrels 44 and 46 and is trimmed to assure complete contact of its opposing end edges with the sidewalls of the mandrels 44 and 46. To assure that the pressure experienced within the hollow mandrel 42 is the same as that provided within a curing autoclave a suitable flexible tube bag 48 is positioned within the hollow mandrel 42 before that mandrel is secured to first uncured composite layer 32 with a suitable adhesive. The flexible tube bag 48 is provided with a suitable vent means which is illustrated as a copper tube 50 or spru that extends from the interior of the flexible tube bag 48 through the second uncured composite layer and is sealed to the vacuum bag 40. Thus, when the lay up assembly on the mandrel 32 is positioned within an autoclave and subjected to a curing cycle of elevated temperature and pressure, the ramp up of pressure within the autoclave will similarly be ramped up within the tube bag 48 with the tube bag 48 expanding to completely fill the cavity within the hollow mandrel 42 and preclude any portion of the mandrel 42 not be supported by a complementary air pressure during such cure cycle.

The arrangement seen in FIG. 4 is then covered with the second uncured composite layer 38 covering the hollow mandrels 42, 44 and 46 and at least a portion of the first uncured composite preform layer 34. The vacuum bag 40 is provided over the lay up assembly and secured to the lay up mandrel 32 as before, with the ends of the tube bags positioned within the hollow mandrels 44 and 46 remaining open, and exhausted to firmly position the bond jig 32 prior to the lay up mandrel 32 being positioned in a suitable autoclave for subjecting the lay up assembly to a suitable co-cure cycle of elevated temperature and pressure. Following the cure cycle in the autoclave the bond jig 32 is removed from the autoclave and the vacuum bag 40 is removed from the co-cured aerostructure article and the vent means 50 may be removed, as desired from the transversely extending hat section 42.

Figure 6:
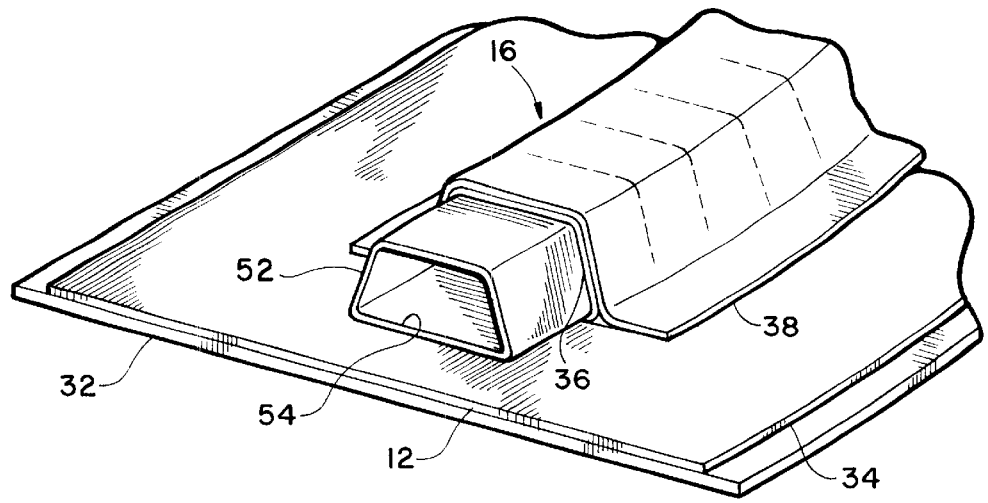
FIG. 6 is a perspective that illustrates the insertion of a removable tooling means into the end of a hollow mandrel to insure precise molding of such end.
Figure 8:
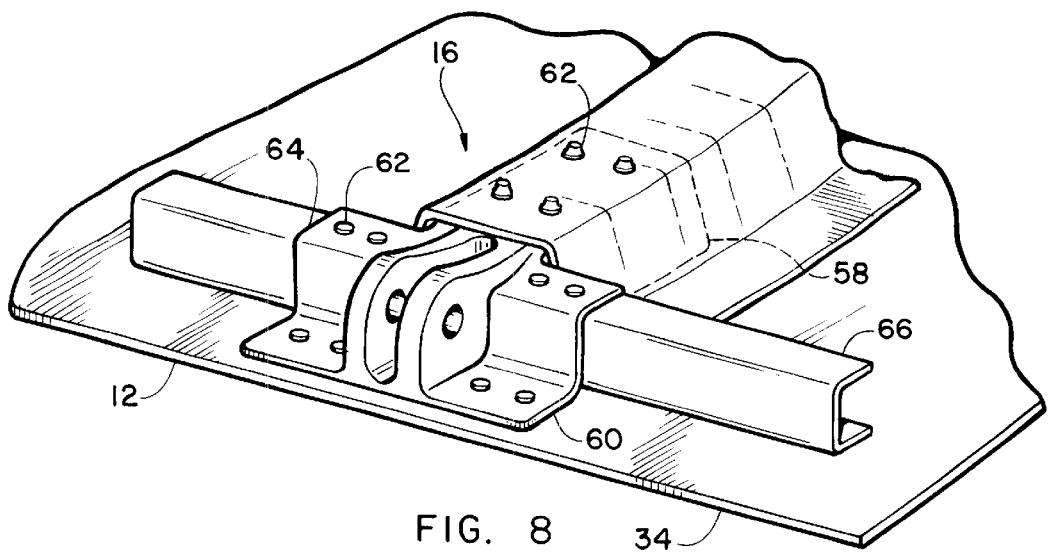
FIG. 8 is a perspective that illustrates how a mechanical attachment may be inserted into and attached to the molded end of a hat section and also attached to a reinforcing longeron member.
Figure 7:
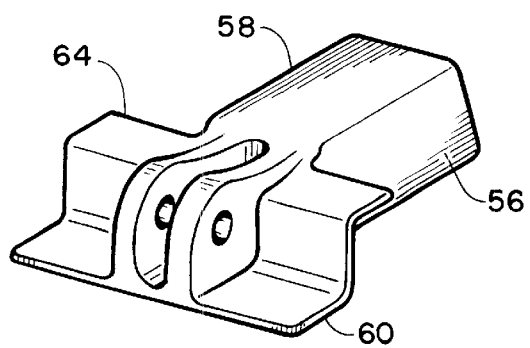
FIG. 7 is a perspective of a typical mechanical means, such as a hinge attachment that may be inserted into such molded end of the hat section and secured to a co-cured aerostructure article.

Another advantageous feature of the present invention is illustrated in FIGS. 6 to 8. Referring first to FIG. 6, it will be seen that novel invention is especially advantageous in providing for precise configurations of the end areas of the reinforcing hat sections for ease in positioning and securing desired mechanical attachments to the hat section and the co-cured first and second uncured composite layers.

As seen, the tooling means 52 is provided with a suitable aperture 54 that permits the insertion of a tube inside the hollow mandrel 36 to provide communication of atmosphere imposed on the exterior of the lay up assembly with the interior of the hollow mandrel 36 during the cure cycle. Thus, when the curing cycle is completed the tooling means 52 is easily removed from the interior of the hollow mandrel 36. A suitable mechanical attachment, such as the hinge member 56 shown in FIG. 7, may be easily inserted into the molded end portion of the hollow mandrel 36. The hinge member 56 is provided with a hollow hat section portion 58 that may be inserted into the hollow mandrel 36 and an integral flange surface 60 that may be positioned on the first composite layer 34, which is now the outer skin layer 12 of FIG. 1, by the illustrated mechanical attachments 62. The hinge member 56 may also be provided with an additional flange surface 64 that may also be secured to a suitable longeron member 66 as shown in FIG. 8 for further reinforcement of the article 10. It is to be understood that the particular arrangements illustrated in FIGS. 1 and 8 for attaching the aerostructure article 10 to other aerostructure components is intended to be exemplary and not limiting in any manner.

Figure 9:
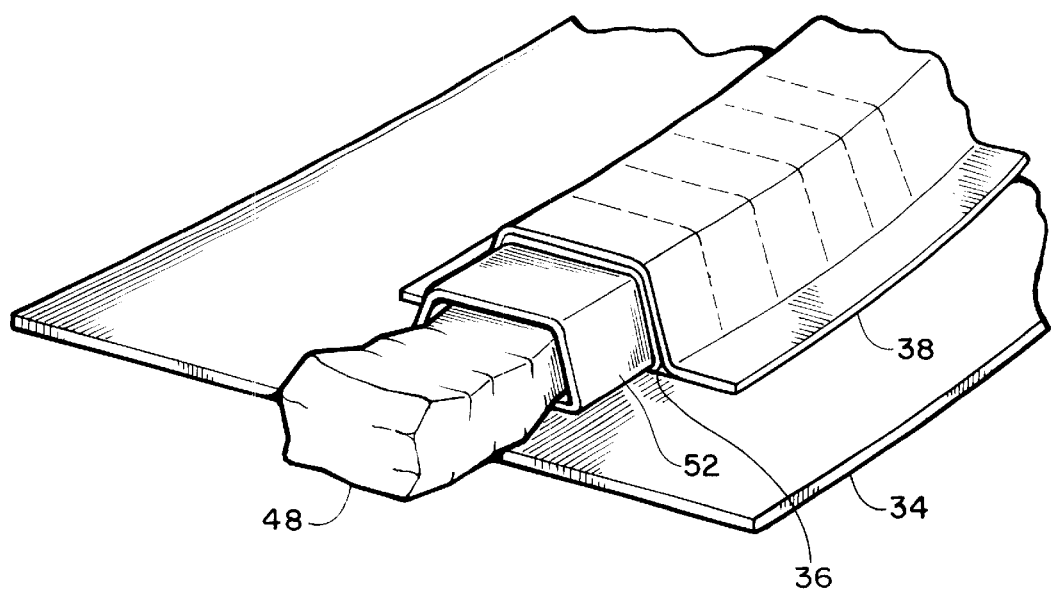
FIG. 9 is a perspective that illustrates the insertion of a tube bag into and through the removable tooling means, seen in FIG. 8, that was inserted into a hollow mandrel.

Referring now to FIG. 9 which is a perspective of the skin layer 34 having a fly away hollow mandrel 36 positioned thereon and an overlying hat section 38 laid thereover. A flexible tube bag 48 is seen extending through the hollow mandrel 36 and extending beyond the outer end of the throw in block 52 positioned in the end of the hollow mandrel 36. While the flexible tube bag 48 is shown in its deformed state during assembly of the lay up on the bond jig 32 it is to be understood that after the lay up assembly has been vacuum bagged and positioned in an autoclave (not shown) the tube bag 48 will expand against the inner wall of the hollow mandrel 36 as the pressure within such autoclave is increased.

Figure 10:
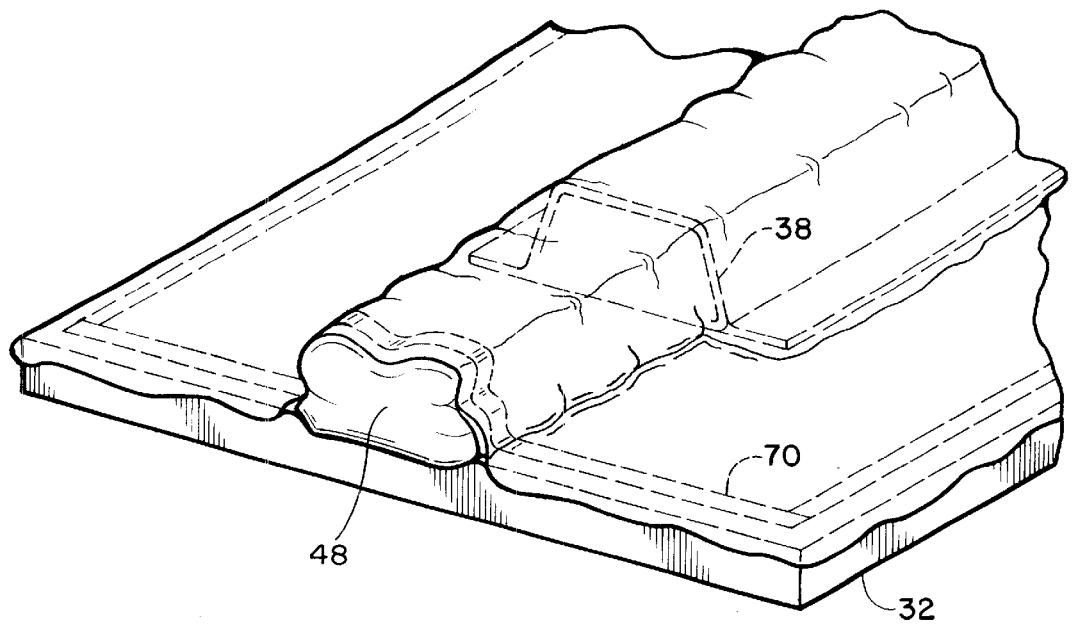
FIG. 10 is a perspective that illustrates the sealing of a tube bag to a vacuum bag and the sealing of the vacuum bag to a bond jig.

As seen in FIG. 10, after the lay up assembly of the aerospace article 10 has been completed the tube bag 48 is sealed to the mandrel 32 and to the overlying vacuum bag 40 by a suitable double sided sealant tape, which double sided sealant tape is also used to seal the vacuum bag at its periphery to the bond jig 32 in a manner known in the art. The bagged lay up assembly of the aerospace article 10 is then ready to be placed in a suitable autoclave for curing.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. An article of fiber-reinforced composite material formed by co-curing under a cycle of heat and pressure a lay up on a composite bond jig, wherein the lay up comprises:
    a first uncured composite layer having at least one uncured resin-impregnated laminate layer;
    at least one longitudinally extending hollow mandrel, the at least one hollow mandrel being of a stiffened graphite fabric and having an upper, a lower and side surfaces and being of a predetermined cross section and being secured on the upper surface of the first composite layer with the lower surface thereof in engagement with the upper surface of the first composite layer; and
    a second uncured composite layer over the upper and side surfaces of the at least one hollow mandrel and at least a portion of the upper surface the first uncured composite layer, the second uncured composite layer having at least one uncured resin-impregnated layer; and
    wherein the at least one hollow mandrel is retained in the co-cured article.

2. The article of claim 1, wherein the cross sectional shape of the at least one hollow mandrel of the lay up varies along its longitudinal extent.

3. The article of claim 1, wherein the cross sectional shape of the at least one hollow mandrel of the lay-up is trapezoidal in shape.

4. The article of claim 1, wherein the lay up includes at least two hollow mandrels secured to the first composite layer in laterally spaced-apart relation and at least one transverse hollow mandrel extending transversely to the two laterally spaced-apart hollow mandrels with the ends thereof in contact with the two laterally spaced-apart hollow mandrels, and wherein the second composite layer covers the two laterally spaced-apart hollow mandrels and the transverse hollow mandrel.

5. The article of claim 1, wherein the lay-up on the bond jig is co-cured at a pressure exceeding 45 psi.

6. The article of claim 1, wherein the lay up further includes a hollow tube bag inserted through the at least one hollow mandrel and a vacuum bag covering the second composite layer and sealed to the bond jig and the hollow tube bag so as to permit the interior of hollow tube bag to communicate with the exterior of the vacuum bag.

7. The article of claim 6, wherein the lay up includes at least two laterally spaced-apart longitudinally extending hollow mandrels secured to the first uncured composite layer.

8. The article of claim 7, wherein the lay-up further includes at least one transverse hollow mandrel extending between and with the ends thereof in contact with the at least two longitudinally extending hollow mandrels and a hollow tube bag within the transverse hollow mandrel, which hollow tube bag within the transverse hollow mandrel is provided with a vent to permit communication of the interior thereof with the exterior of the vacuum bag.

9. The article of claim 6, wherein the lay-up further includes a tooling block inserted into at least one end of the at least one hollow mandrel that permits communication of the interior of the at least one hollow mandrel with the exterior of the vacuum bag and which precisely fits within the interior of the end of the at least one hollow mandrel for a predetermined distance.

10. The article of claim 1, wherein the second uncured composite layer includes a plurality of serially laid-up uncured resin impregnated layers.

11. An article, comprising:
    a first composite layer formed of an uncured resin-impregnated laminate layer;
    a pair of laterally spaced-apart elongated stiffened graphite fabric hollow mandrels, each having a lower, an upper and side surfaces, the pair of hollow mandrels having their lower surfaces secured to the upper surface of the first composite layer; and
    a second composite layer formed of an uncured resin-impregnated laminate layer that is secured to at least portions of the first composite layer and to the upper and side surfaces of the hollow mandrels, the first and second composite layers being co-cured to provide an integral one piece article having reinforcing hat sections formed by the second composite layer.

12. The article of claim 11, wherein the first and second composite layers are co-cured together with the hollow mandrels such that resin from the first and second composite layers penetrates the fabric of the hollow mandrels to provide a consolidated integral article.

13. The article of claim 11, which further includes at least one stiffened graphite fabric transverse hollow mandrel having an upper, a lower and side surfaces, the transverse mandrel extending transversely between the pair of laterally spaced-apart hollow mandrels, having its lower surface secured to the first composite layer, and having its ends in contact with the side surfaces of the laterally spaced-apart hollow mandrels, and wherein portions of the second composite layer engage the upper and side surfaces of the transverse hollow mandrel.

14. The article of claim 11, which further includes a mechanical attachment device fixedly secured within at least one open end of the at least one of the pair of hollow mandrels and overlying a portion of the second composite layer.

15. The article of claim 11, which further includes at least one stiffening longeron member secured to the article along one margin thereof, the longeron member being secured to the mechanical attachment device.

\* \* \* \* \*